Figure 1:
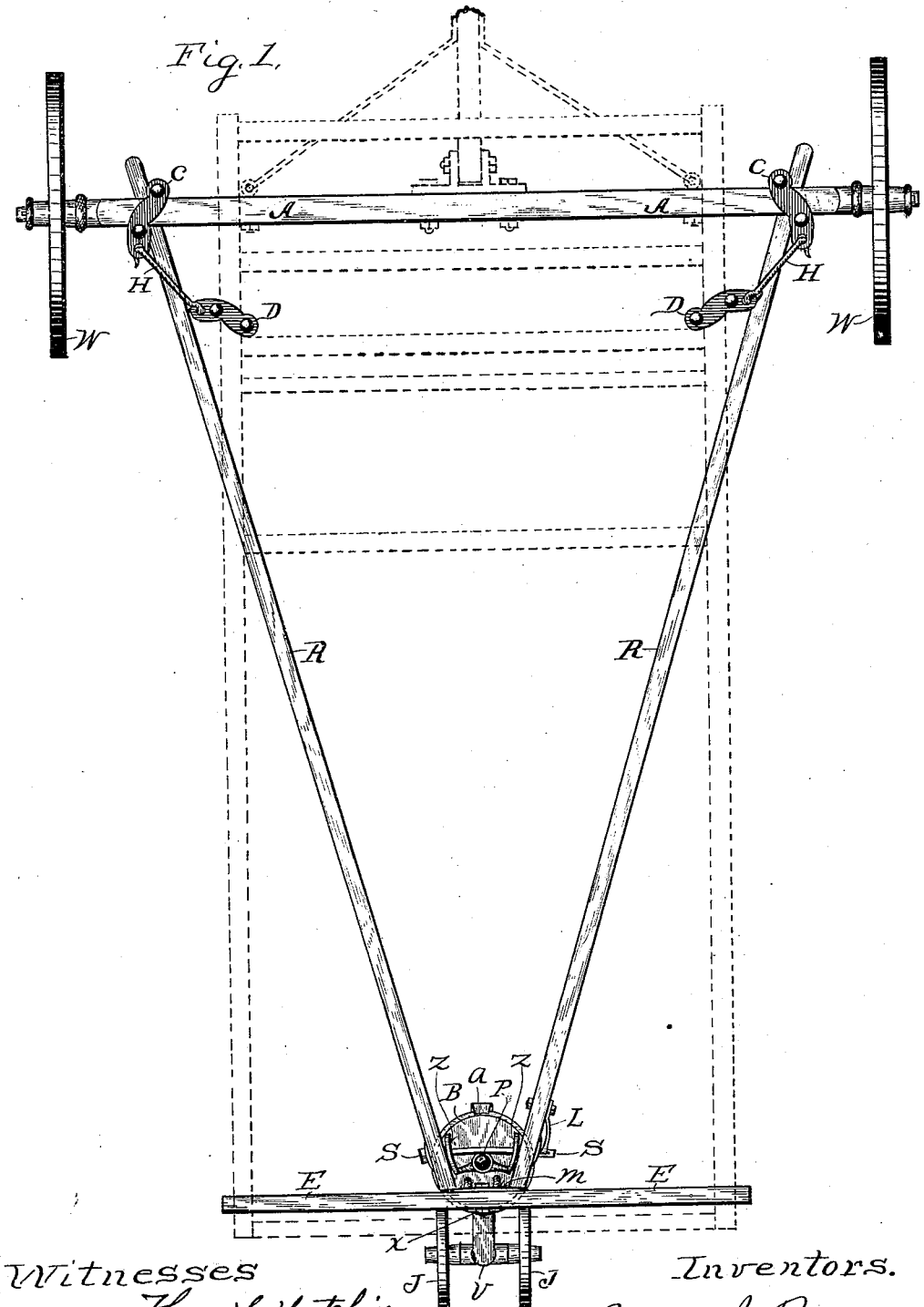

(No Model.)  2 Sheets—Sheet 1.

M. J. BARRON & J. F. CURREN.
TRUCK.

No. 309,919.  Patented Dec. 30, 1884.

Witnesses  Inventors.
Thos. H. Hutchins,  Moses J. Barron,
Wm. J. Hutchins,  John F. Curren.

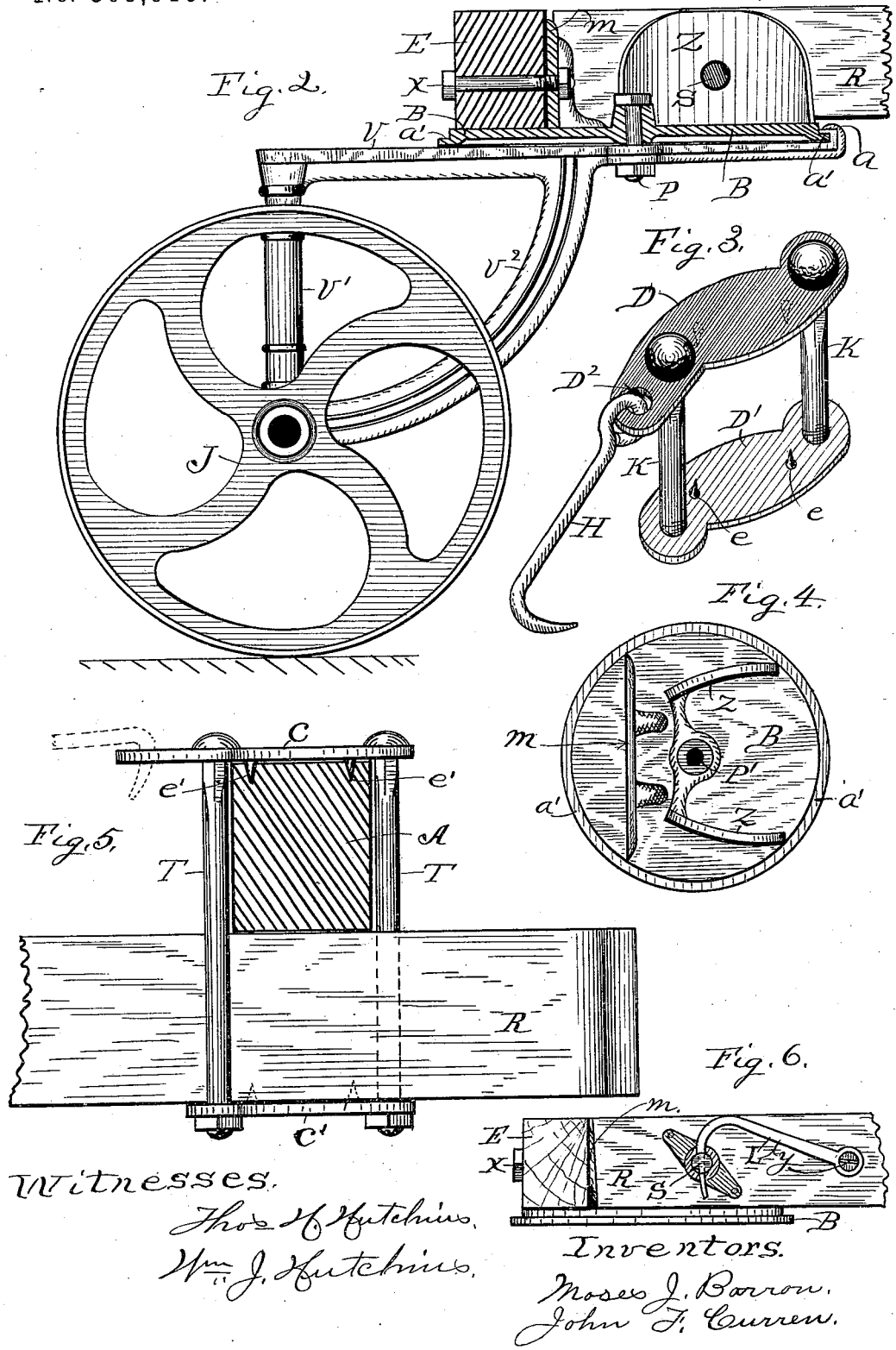

UNITED STATES PATENT OFFICE.

MOSES J. BARRON AND JOHN F. CURREN, OF JOLIET, ILLINOIS, ASSIGNORS OF ONE-THIRD TO THOMAS MIDDLETON, OF SAME PLACE.

TRUCK.

SPECIFICATION forming part of Letters Patent No. 309,919, dated December 30, 1884.

Application filed September 11, 1884. (No model.)

*To all whom it may concern:*

Be it known that we, MOSES J. BARRON and JOHN F. CURREN, citizens of the United States of America, residing at Joliet, in the county of Will and State of Illinois, have invented certain new and useful Improvements in Trucks, of which the following is a specification, reference being had therein to the accompanying drawings.

Figure 1 is a top plan view; Fig. 2, a side elevation of the caster-wheel frame having wheels thereon, and a central cross-section of its supporting-disk and a portion of the frame above which it attaches to the said disk; Fig. 3, a perspective view of a clip having a hook attached thereto; Fig. 4, a top plan view of the supporting-disk; Fig. 5, a cross-sectional view of the axle and a side view of a portion of one reach, showing the manner in which they are clipped together; and Fig. 6, a side view of the rear portion of one of the reaches and its immediate accompanying parts, showing the manner of fastening the bolt S to hold the two reaches together on the supporting-disk.

This invention relates to certain improvements in trucks, and is intended to be used for transporting grain-harvesters; but it may, however, be used for any other purpose desired for which it may be adapted; and it consists of an axle, a pair of reaches clipped thereto, and a rear cross supporting-bar supported by means of a pair of traveling wheels placed on the axle and a pair of caster-wheels attached to a single frame, and so arranged that the reaches converge from the axle toward their rear ends, where they attach to a circular plate or disk supported on the frame of the caster-wheels. A pair of clip-plates united by a pair of bolts and having a hook attached to one of the plates accompany each axle-clip, and are intended to be clamped on a harvester-frame, which may be placed on said truck and their hooks hooked into eyes in the axle-clips to hold the frame to which they are attached secure to the truck. A tongue attaches to the axle to furnish means for hauling the truck.

Referring to the drawings, A represents the axle of the truck, supported by means of the two traveling wheels W W, and having a tongue attached thereto, as shown by the dotted lines in Fig. 1. R R are a pair of reaches secured to the axle A by means of the clip-plates C C' and bolts T T, as shown in Figs. 1 and 5. All these clip-plates are provided with sharp-pointed lugs $e$ on their inner faces, as shown in Figs. 3 and 5, which enter the reaches and axle, as shown in Fig. 5, when they are secured thereto by means of the bolts T T, so as to render it unnecessary to bore holes through either the axle or reaches to weaken them, and also will permit the clips to attach at any place along on either the axle or reaches. The reaches R R converge at their outer ends, and are secured by means of bolt S to the outer sides of the vertical segment flanges or lugs Z Z, integral with disk B, by means of which connection thereto the opposite ends of the reaches may be moved along on the axle without disturbing said connection, as shown in Fig. 1. A pivoted key, L, pivoted to the side of one of the reaches, passes through the outer end of said bolt S to hold it in, as is shown in Figs. 1 and 6. Disk B is also provided on its upper surface with the vertical integral lug $m$, as shown in Figs. 1, 2, and 4, by means of which the supporting-cross-bar E is attached to said disk and lug by means of the bolt X. (Shown more particularly in Fig. 2.) The disk-plate B rests on the upper flattened surface of the frame V of the caster-wheels J, as is shown in Fig. 2, and is held thereon by means of the central bolt and nut, P, as a pivotal center, on which the frame V rotates. The form and construction of the caster-wheel frame is shown at V' V², Fig. 2, and is supported by the two caster-wheels J J, as shown in Figs. 1 and 2. The caster-frame V is provided at its front end with an upwardly-extending hook, $a$, to hook over the annular flange $a'$ of disk B, as shown in Fig. 2, to hold the two together and relieve the bolt P from all the strain. The secondary clip-plates D (shown in Figs. 1 and 3) are designed to attach to the harvester-frame, as shown in Fig. 1, and connected to the clip-plates C on the axle A by means of the hooks H, to furnish means for securing the harvester to the truck after it is loaded thereon.

When desired, the truck may be placed under the harvester sidewise. In such case a wheel, W, can be removed and one pair of clip-plates, C and C', can be loosened, and the said clip-plates and the reach to which they attach be turned out from the axle, which is permitted by the curved surface or face of the lugs, to which they attach at their rear end.

Ordinarily the truck can be placed under the harvester by removing the key L from bolt S, so one of the reaches may be loosened and the two reaches be spread apart at that end, and then closed together again after they are placed properly under the harvester.

We are aware that trucks having a frame similar to the one described and mounted on traveling and caster wheels have been used before; but we are not aware of any truck having its reaches and axle clipped together by means of such clips as are shown, and having the auxiliary clips D to secure a harvester-frame on the truck by means of hooks attached to said clips; nor are we aware of any caster-wheel frame which is attached to a truck by means of such a circular flanged disk, B, and having the lugs on its upper surface for the attachment of a supporting cross-bar and reaches, and in which the lugs or flanges to which the reaches are attached are curved to permit the reaches to rock on their surfaces, nor where a pivoted key is used to lock in the bolt S to hold the reaches connected to said lugs.

Having thus described our invention, what we claim as new, and desire to secure by Letters Patent, is as follows, to wit:

1. The combination of the axle A, clips C C', D and D', each having the pointed lugs $e$, hook H, and reaches R R, as and for the purpose set forth.

2. The disk B, having the segment-lugs Z Z, lug or flange $m$, and annular flange $a'$, in combination with the reaches R R, cross-bar E, caster-frame V, bolts P and S, and caster-wheels J J, axle A, and wheels W W, as and for the purpose set forth.

3. In a truck for transporting grain-harvesters or other machines, the combination of a disk having an upwardly-turned flange to which a supporting cross-bar is attached, a pair of curved upwardly-extending flanges to which a pair of reaches are attached by means of a bolt or pin passing through them, and a caster-wheel frame pivoted to the under side of said disk by means of a bolt, for the purpose specified.

4. In a truck for the purpose specified, the clip-plates C and C', having the pointed lugs $e$, as shown, in combination with the secondary clip-plates D and D', the plate D having an eye into which a hook, H, is secured, and the plate C having an eye into which the hook H is hooked when a harvester or other machine is being transported, as and for the purpose set forth.

MOSES J. BARRON.
JOHN F. CURREN.

Witnesses:
THOS. H. HUTCHINS,
WM. J. HUTCHINS.